United States Patent
Hong

(10) Patent No.: US 7,124,026 B2
(45) Date of Patent: Oct. 17, 2006

(54) METHOD AND APPARATUS FOR ESTIMATING TIME DELAY OF GPS RECEIVER IN HYBRID NAVIGATION SYSTEM

(75) Inventor: Hyun-Su Hong, Seongnam-si (KR)

(73) Assignee: Samsung Electronics Co., Ltd., (KR)

( * ) Notice: Subject to any disclaimer, the term of this patent is extended or adjusted under 35 U.S.C. 154(b) by 129 days.

(21) Appl. No.: 10/868,412

(22) Filed: Jun. 15, 2004

(65) Prior Publication Data
US 2005/0137800 A1 Jun. 23, 2005

(30) Foreign Application Priority Data
Dec. 18, 2003 (KR) ............. 10-2003-0093275

(51) Int. Cl.
*G01C 21/26* (2006.01)
(52) U.S. Cl. ............ 701/216; 701/207; 701/213; 701/214; 701/217; 342/357.14
(58) Field of Classification Search ........ 701/213, 701/214, 207, 215, 216, 217, 200, 300; 342/357.14, 342/389, 451, 457
See application file for complete search history.

(56) References Cited
U.S. PATENT DOCUMENTS
5,311,195 A * 5/1994 Mathis et al. ......... 342/357.14
5,774,829 A * 6/1998 Cisneros et al. ............ 701/213

* cited by examiner

Primary Examiner—Gertrude A. Jeanglaude
(74) Attorney, Agent, or Firm—Dilworth & Barrese LLP

(57) ABSTRACT

An method and apparatus for estimating a time delay of a GPS receiver in a hybrid navigation system is disclosed. In the hybrid navigation system including the GPS receiver and a DR system, a time difference between a time, at which a velocity measured by the DR system exceeds a reference velocity, and a time, at which a velocity measured by the GPS receiver exceeds the reference velocity, is measured to calculate the time delay of the GPS receiver, so that a GPS/DR system having a loosely-coupled structure which considers the time delay can be realized. Further, in the system, when a vehicle moves from a GPS reception area to a non-reception area and a GPS/DR system mode changes into a DR system mode, an initial velocity value can be estimated while a time delay is considered for a DR system. Furthermore, since a velocity measurement apparatus for vehicles designed in accordance with the apparatus and the method has a performance superior to a velocity measurement apparatus for vehicles in the prior art, it can ultimately contribute to the position estimation accuracy of a position measurement apparatus for vehicles.

6 Claims, 5 Drawing Sheets

METHOD AND APPARATUS FOR ESTIMATING TIME DELAY OF GPS RECEIVER IN HYBRID NAVIGATION SYSTEM

PRIORITY

This application claims priority to an application entitled "Method and Apparatus For Estimating Time Delay Of GPS Receiver In Hybrid Navigation System" filed in the Korean Intellectual Property Office on Dec. 18, 2003 and assigned Ser. No. 2003-93275, the contents of which are incorporated herein by reference.

BACKGROUND OF THE INVENTION

1. Field of the Invention

The present invention relates to a vehicle navigation system, and more particularly relates to a method and an apparatus for estimating a time delay of a GPS receiver in a hybrid navigation system.

2. Description of the Related Art

Navigation systems, which determine positions of movable bodies, and search for paths to a destination so as to provide an optimal path, are typically mounted on movable bodies such as ships, airplanes, or vehicles. Further, in order to determine the position of the movable body and provide the optimal path to the destination, a navigation system must be able to determine an accurate position of the movable body.

Accordingly, navigation systems typically have a positioning apparatus for determining their own position. The positioning apparatus is classified into an apparatus of determining a position with exterior help and an apparatus of determining a position by means of an interior sensor. A representative example of the former is a global positioning system (hereinafter, referred to as a GPS) and a representative example of the latter is a dead reckoning system (hereinafter, referred to as a DR) using an inertial sensor.

A DR system (so-called "inertial navigation system") including the inertial sensor is a navigation system which had been initially developed by the Massachusetts Institute of Technology in the USA in the early 1950's and had been put to practical use in the 1960's. The DR system obtains a velocity by means of a speedometer or an accelerometer, and obtains a movement direction by means of a gyroscope for detecting a rotation motion of a vehicle and a magnetic compass for measuring an azimuth angle by using the Earth's magnetic field. That is, the DR system integrates an output of the gyroscope by measuring a rotation angular velocity to obtain a travel direction angle of the vehicle, and compensates for an acceleration of gravity from an output of the accelerometer and integrates the compensated signal, thereby autonomously calculating the current velocity and position of the vehicle.

The DR system can provide accurate and continuous navigation data for a short period. However, the DR system has a disadvantage in that due to the integration process, an error is accumulated over the passage of time.

Meanwhile, the GPS is far behind the DR system in terms of momentary accuracy, but an error is not accumulated over the passage of time.

Accordingly, in order to secure higher accuracy and long-term stability, most DR systems are not used alone, but are used together with a non-inertial auxiliary sensor such as a magnetic compass or a GPS. This type of navigation system, using an inertial sensor and a non-inertial sensor, is called a hybrid navigation system. From among hybrid navigation systems, a GPS/DR system is designed to have advantages of the DR system and the GPS by combining the DR system and a GPS receiver into one system.

The GPS/DR system may have a loosely-coupled structure or a tightly-coupled structure according to the desired design. In the loosely-coupled structure, the GPS receiver and the DR system are maintained as respective independent systems and their respective outputs are combined. In contrast, in the tightly-coupled structure, a measured value, such as a pseudo-range provided from a GPS satellite to the GPS receiver, and measured values of an angular velocity and an acceleration, which are obtained from the inertial sensor, are internally combined. In order to maximize the coupling of the GPS and the DR system, the tightly-coupled structure is adequate. However, the loosely-coupled structure has a design that is simple and therefore realization is easy. In addition, since sufficient performance may be obtained with the loosely-coupled structure, the loosely-coupled structure is generally used in the navigation system.

FIG. 1 is a block diagram schematically showing a conventional hybrid navigation system. Referring to FIG. 1, the hybrid navigation system 10 includes a DR system 12, a GPS receiver 14, and a combination filter 16. Since the hybrid navigation system 10 includes the DR system 12 and the GPS receiver 14, it is also called a GPS/DR system. Each of the DR system 12 and the GPS receiver 14 calculates position/velocity/direction angle information, and sends this calculated information to the combination filter 16. The combination filter 16 combines the information to obtain a navigation solution of the hybrid navigation system. The DR system 12 uses an output feedback from the combination filter 16.

One of items which must be considered in the GPS/DR system is a time delay of information provided by the GPS. That is, the GPS receiver delays by a predetermined time information at a specific time to provide the delayed information, and therefore the GPS/DR system must consider the time delay when calculating the velocity of the vehicle.

FIG. 2 is a view showing a time delay of a GPS receiver in a conventional hybrid navigation system. Referring to FIG. 2, a velocity $V_G$ provided by the GPS receiver starts later than a velocity $V_A$ obtained from an accelerometer. That is, the velocity $V_G$ provided by the GPS receiver is delayed by a predetermined time.

Generally, the GPS receiver has a time delay of about 1 sec. However, when a tracking loop or a filter is used in the GPS receiver in order to improve the accuracy of the GPS receiver position solution, the GPS receiver has a time delay of more than 1 sec.

In the tightly-coupled structure, since the GPS receiver is not independently maintained, it is possible to design the GPS receiver so that a large time delay does not occur. In contrast, in the loosely-coupled structure, the time delay of the GPS receiver may greatly deteriorate the performance of the GPS/DR system. Further, when a vehicle moves from a GPS reception area to a non-reception area, a GPS/DR system mode is switched into a DR system mode. Here, since the accuracy of an initial velocity value is very important, the influence due to the time delay may be quite significant.

In order to reduce an error due to the time delay of the GPS receiver in the GPS/DR system having the loosely-coupled structure, the time delay must be minimized in the design of the system, or the system must be designed after the magnitude of the time delay is estimated. Accordingly, a method, which minimizes the time delay after estimating the magnitude of the time delay, is required.

The prior art usually employs a method of comparing velocity data of the DR system with velocity data provided by the GPS receiver, so as to obtain the time delay of the GPS receiver. In this way, in order to accurately measure the time delay of the GPS receiver, the velocity data of the DR system must be accurate. However, the DR system, which measures the velocity by means of the accelerometer, cannot accurately measure velocity because of the characteristics of the accelerometer. That is, since a value measured by the accelerometer contains a gravity component, it is difficult to obtain a pure acceleration component. Further, an error of the velocity obtained from the accelerometer is accumulated over time. Accordingly, because of the characteristics of the accelerometer, the DR system cannot accurately measure velocity.

Therefore, when the time delay of the GPS receiver is estimated by means of the conventional method, the measured result may be inaccurate. Further, even when the system is designed to compensate for the time delay, the performance of the entire hybrid navigation system may deteriorate.

SUMMARY OF THE INVENTION

Accordingly, the present invention has been made to solve the above-mentioned problems occurring in the prior art, and an object of the present invention is to provide an apparatus and a method of a hybrid navigation system which maintains an inherent property of a GPS receiver in a low-grade hybrid navigation system including one or two accelerometers and a gyroscope, or one or two accelerometers and a magnetic compass.

Another object of the present invention is to provide an apparatus and a method for schematically estimating a time delay of a GPS receiver in a hybrid navigation system including an accelerometer and the GPS receiver.

A further object of the present invention is to provide a method capable of realizing a hybrid navigation system which considers a time delay from the magnitude of the schematically estimated time delay.

Yet another object of the present invention is to provide a method capable of realizing a velocity measurement apparatus for vehicles which compensates for a time delay of a GPS receiver in the velocity measurement apparatus for vehicles including an accelerometer and the GPS receiver.

In order to accomplish the aforementioned objects, according to an embodiment of the present invention, there is provided a method for estimating a time delay of a GPS receiver in a hybrid navigation system, the hybrid navigation system including a DR system and the GPS receiver, the method including setting a reference velocity for estimating the time delay of the GPS receiver; detecting velocity measurement results of the GPS receiver and the DR system; setting a first moment, at which the detected velocity measurement result of the DR system equals or exceeds the reference velocity, as a first reference time, and repeating the detecting step; setting a second moment, at which the velocity measurement result of the GPS receiver equals or exceeds the reference velocity, as a second reference time; and calculating the time delay of the GPS receiver by subtracting the first reference time from the second reference time.

In order to accomplish the aforementioned objects, according to another embodiment of the present invention, there is provided a method for estimating a time delay of a GPS receiver in a hybrid navigation system, the hybrid navigation system including a DR system and the GPS receiver, the method including detecting velocity measurement results of the GPS receiver and the DR system; sensing a reference velocity for estimating the time delay of the GPS receiver when at least one of detected velocity measurement results of the GPS receiver and the DR system is '0', and repeating the detecting step; capturing a first moment at which the velocity measurement result of the GPS receiver begins to exceed '0' in a state in which the detected velocity measurement result of the DR system exceeds '0', setting the first moment as a first reference time, setting the velocity measurement result of the DR system at the first reference time as the reference velocity, and repeating the detecting step; capturing a second moment at which the velocity measurement result of the GPS receiver begins to exceed the reference velocity as a result of said detecting step, and setting the second moment as a second reference time; and calculating the time delay of the GPS receiver by subtracting the first reference time from the second reference time.

In order to accomplish the aforementioned objects, according to further embodiment of the present invention, there is provided an apparatus for estimating a time delay of a GPS receiver in a hybrid navigation system, the hybrid navigation system including a DR system and the GPS receiver, the apparatus including a velocity detection unit for detecting velocities measured by the GPS receiver and the DR system; a velocity comparison unit for storing a reference velocity for estimating the time delay of the GPS receiver, and capturing a moment at which each velocity measured by the GPS receiver and the DR system exceeds the reference velocity; and a time delay calculation unit for calculating a time difference between the moment at which the velocity measured by the GPS receiver exceeds the reference velocity and the moment at which the velocity measured by the DR system exceeds the reference velocity, and estimating the time difference as the time delay of the GPS receiver.

In order to accomplish the aforementioned objects, according to yet another embodiment of the present invention, there is provided an apparatus for estimating a time delay of a GPS receiver in a hybrid navigation system, the hybrid navigation system including a DR system and the GPS receiver, the apparatus including a velocity detection unit for detecting velocities measured by the GPS receiver and the DR system; a velocity comparison unit for capturing a first moment at which the velocity measured by the GPS receiver exceeds '0' to set the first moment as a first reference time, setting the velocity measurement result of the DR system at the first reference time as a reference velocity, and capturing a second moment at which the velocity measured by the GPS receiver exceeds the reference velocity to set the second moment as a second reference time, and a time delay calculation unit for calculating a time difference between the first reference time and the second reference time, and estimating the time difference as the time delay of the GPS receiver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may make the subject matter of the present invention unclear.

Figure 1:
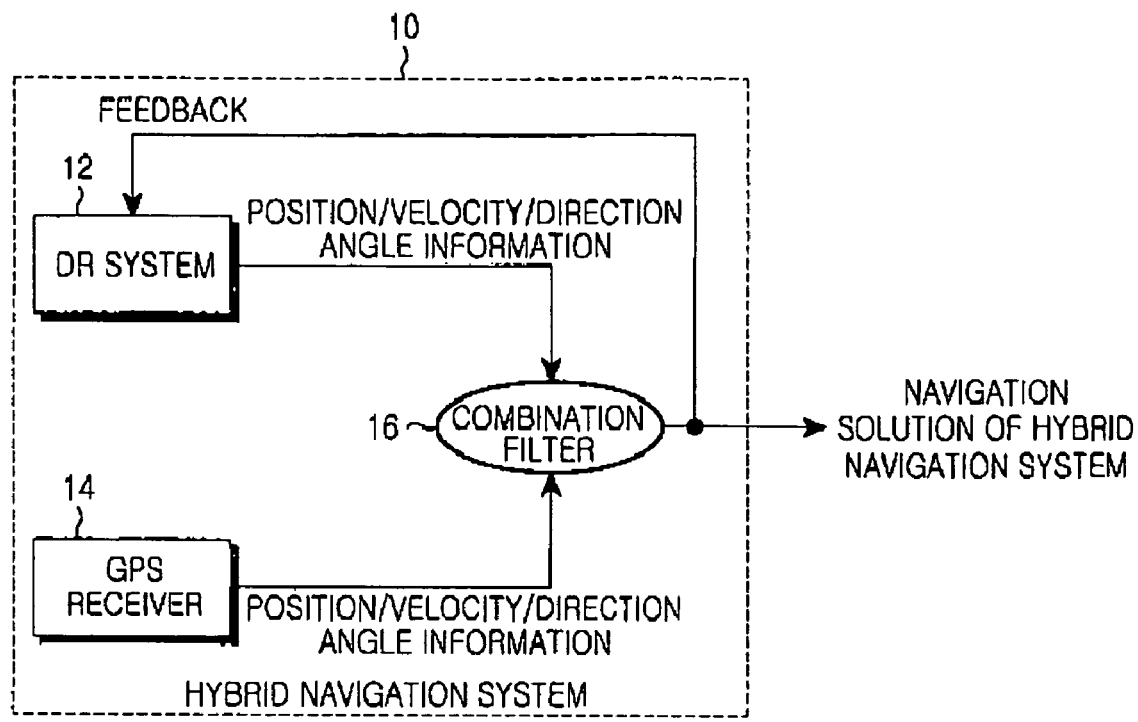
FIG. 1 is a block diagram schematically showing a conventional hybrid navigation system.
Figure 2:
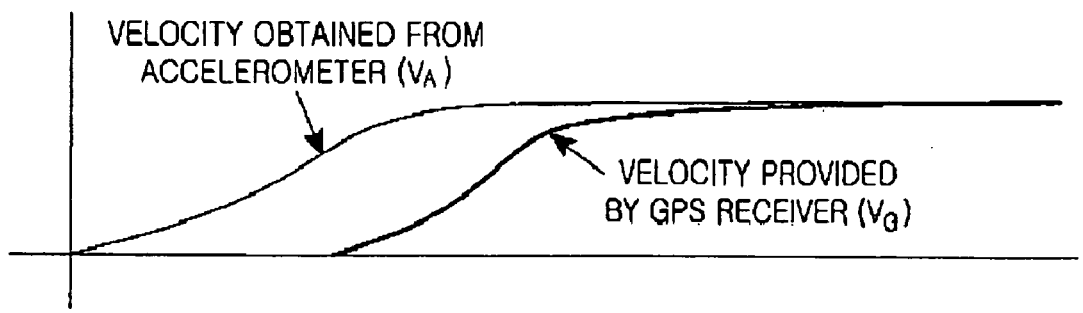
FIG. 2 is a view showing a time delay of a GPS receiver in a conventional hybrid navigation system.
Figure 3:
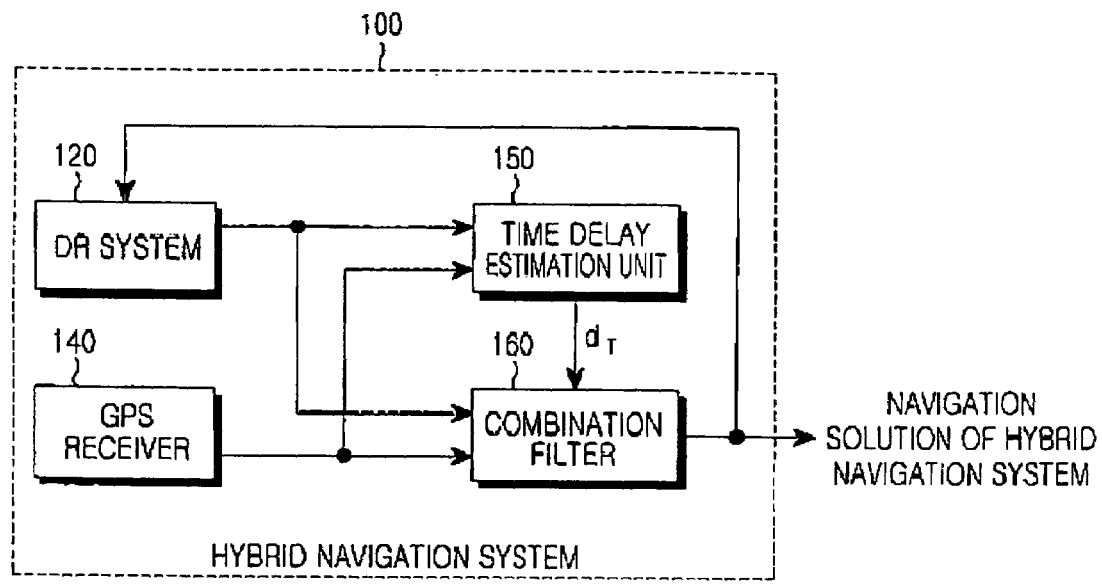
FIG. 3 is a block diagram showing a hybrid navigation system employing a time delay estimation apparatus according to an embodiment of the present invention.

FIG. 3 is a block diagram showing a hybrid navigation system employing a time delay estimation unit according to an embodiment of the present invention. Referring to FIG. 3, the hybrid navigation system 100 containing the time delay estimation unit 150 according to an embodiment of the present invention includes a DR system 120, a GPS receiver 140, and a combination filter 160. The DR system 120 and the GPS receiver 140 transmit velocity measurement results to the time delay estimation unit 150. Further, the combination filter 160 receives each velocity measurement result from the DR system 120 and the GPS receiver 140, receives a time delay $d_T$ of the GPS receiver 140 from the time delay estimation unit 150, and calculates a navigation solution of the hybrid navigation system 100. Herein, the DR system 120 receives a result fed back from the combination filter 160 and uses the received result in calculating a velocity.

Figure 4:
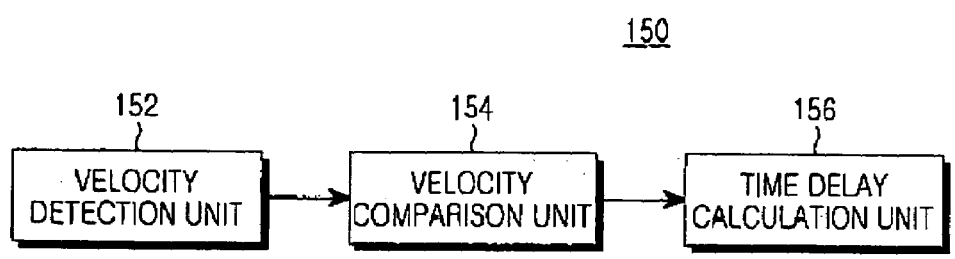
FIG. 4 is a block diagram showing a time delay estimation apparatus according to an embodiment of the present invention.

FIG. 4 shows internal blocks of the time delay estimation unit 150 of the present invention applied to the hybrid navigation system 100. Referring to FIGS. 3 and 4, the time delay estimation unit 150 according to an embodiment of the present invention includes a velocity detection unit 152, a velocity comparison unit 154, and a time delay calculation unit 156.

The velocity detection unit 152 detects velocities measured by the GPS receiver 140 and the DR system 120 and transmits the detected velocities to the velocity comparison unit 154.

The velocity comparison unit 154 stores a reference velocity $V_{REF}$ for estimating the time delay of the GPS receiver 140, and records a moment in time at which each velocity measured by the GPS receiver 140 and the DR system 120 exceeds the reference velocity $V_{REF}$. For instance, the moment at which the velocity measured by the DR system 120 exceeds the reference velocity $V_{REF}$ is set as a first time $t_1$, and the moment at which the velocity measured by the GPS receiver 140 exceeds the reference velocity $V_{REF}$ is set as a second time $t_2$. If the reference velocity $V_{REF}$ is set as '0', the moment at which the velocity measured by the DR system 120 exceeds '0' is set as a first time $t_1$, and the moment at which the velocity measured by the GPS receiver 140 exceeds '0' is set as a second time $t_2$.

The time delay calculation unit 156 calculates a time difference between the first time $t_1$ at which the velocity measured by the DR system 120 exceeds the reference velocity $V_{REF}$ and the second time $t_2$ at which the velocity measured by the GPS receiver 140 exceeds the reference velocity $V_{REF}$. Further, the time delay calculation unit 156 estimates the time difference as the time delay $d_T$ of the GPS receiver 140. Herein, an operation of the time delay calculation unit 156 is expressed by Equation 1.

$$d_T = t_2 - t_1 \quad (1)$$

As described above, the velocity comparison unit 154 may store a predetermined reference velocity for estimating the time delay of the GPS receiver 140. In addition, the velocity comparison unit 154 itself sets a reference velocity value and may estimate the time delay of the GPS receiver 140 by using this value.

For this, the velocity comparison unit 154 records a moment at which the velocity measured by the GPS receiver 140 exceeds '0', sets the moment as a first reference time $t_1$, and sets the velocity measurement result in the DR system 120 at the first reference time $t_1$ as a reference velocity $V_{REF}$. Then, the velocity comparison unit 154 records a moment at which the velocity measured by the GPS receiver 140 exceeds the reference velocity $V_{REF}$, and sets the moment as a second reference time $t_2$.

Further, the time delay calculation unit 156 calculates a time difference between the first reference time $t_1$ and the second reference time $t_2$, and estimates the time difference as the time delay $d_T$ of the GPS receiver 140. Herein, an equation by which the time delay calculation unit 156 calculates the time delay $d_T$ is as shown in Equation 1.

Figure 5A:
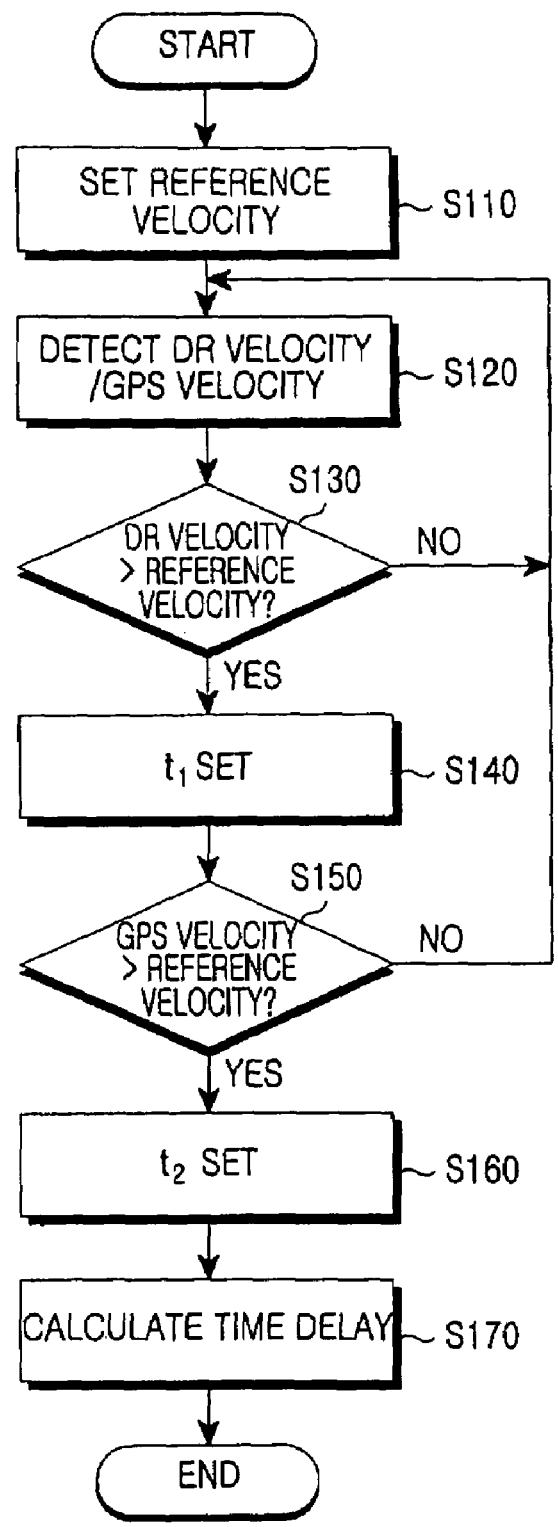
FIGS. 5A and 5B are flowcharts illustrating GPS time delay estimation methods according to a first embodiment and a second embodiment of the present invention.
Figure 5B:
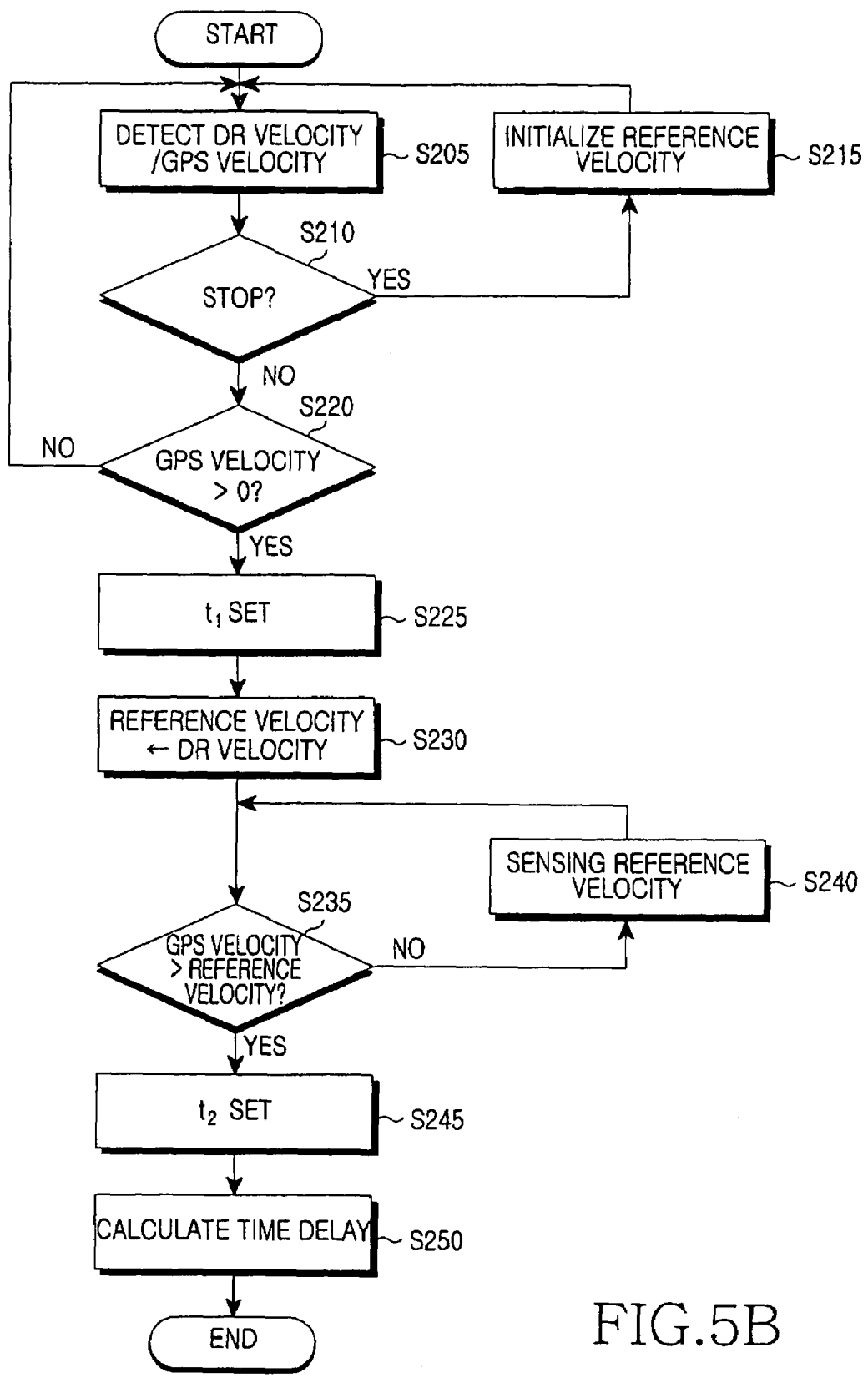

FIGS. 5A and 5B are flowcharts illustrating GPS time delay estimation methods according to a first embodiment and a second embodiment of the present invention. Hereinafter, the GPS time delay estimation method according to the first embodiment of the present invention will be described with reference to FIGS. 4 and 5A. At step S110, the time delay estimation unit 150 sets a reference velocity $V_{REF}$ for estimating the time delay of the GPS receiver 140, in order to calculate the time delay of the GPS receiver 140 by measuring a time difference between a time at which a velocity calculated by the DR system 120 arrives at the reference velocity $V_{REF}$, and a time at which a velocity calculated by the GPS receiver 140 arrives at the reference velocity $V_{REF}$. Herein, it is preferred that the reference velocity $V_{REF}$ is set as a predetermined value which is greater than '0'.

When the reference velocity is set as described above, the velocity detection unit 152 detects a velocity (hereinafter, referred to as a DR velocity) measured by a DR system 120 and a velocity (hereinafter, referred to as a GPS velocity) measured by a GPS receiver 140 at step S120. Further, in step S130, the velocity comparison unit 154 compares the reference velocity set in step S110 with the DR velocity detected in step S120. From the result of the comparison, when the DR velocity is greater than the reference velocity, the velocity comparison unit 154 sets a moment at which the DR velocity exceeds the reference velocity as a first reference time $t_1$ at step S140. If the DR velocity is less than the reference velocity, the process returns to step S120. Further, in step S150, the velocity comparison unit 154 compares the reference velocity set in step S110 with the GPS velocity detected in step S120. From the result of the comparison, when the GPS velocity is greater than the reference velocity, the velocity comparison unit 154 sets a moment at which the GPS velocity exceeds the reference velocity as a second reference time $t_2$ at step S160. If the GPS velocity is less than the reference velocity, the process returns to step S120.

When the first reference time $t_1$ and the second reference time $t_2$ are set as described above, the time delay calculation unit 156 calculates a time difference between the first reference time $t_1$ and the second reference time $t_2$, and estimates the time difference as a time delay at step S170.

Hereinafter, the GPS time delay estimation method according to the second embodiment of the present invention will be described with reference to FIGS. 4 and 5B.

The velocity detection unit 152 detects velocity measurement results of the DR system 120 and the GPS receiver 140 at step S205. Herein, from the measurement result, at step S210 when it is determined as a stop, that is, the velocity measurement results of the DR system 120 and the GPS receiver 140 are '0', a reference velocity $V_{REF}$ for estimating the time delay of the GPS receiver is initialized at step S215. If a step is not determined at step S210, the process proceeds to step S220.

Meanwhile, from the result of detecting the velocity measurement results of the GPS receiver 140 and the DR system 120, if a GPS velocity is greater than '0' at step S220, a moment at which the GPS velocity is to exceeds '0' is set as a first reference time $t_1$ at step S225. Herein, a DR velocity at the first reference time $t_1$ is set as the reference velocity $V_{REF}$ at step S230.

Further, the GPS velocity is compared with the reference velocity $V_{REF}$ at step S235, and the DR velocity and the GPS velocity are continuously monitored until the GPS velocity exceeds the reference velocity $V_{REF}$ at step S235. From the result of the comparison in step 235, when the GPS velocity exceeds the reference velocity $V_{REF}$, a moment at which the GPS velocity exceeds the reference velocity $V_{REF}$ is recorded and set as a second reference time $t_2$ at step S245. If the GPS velocity is less than the reference velocity $V_{REF}$ at step S235, the process proceeds to step S240. At step 240, the reference velocity $V_{REF}$ is sensed for estimating the time delay of the GPS receiver 140 and then the process returns to step S235. Then, at step 250, the time delay is calculated by means of a time difference between the first reference time $t_1$ set in step 225 and the second reference time $t_2$ set in step S245.

Figure 6A:
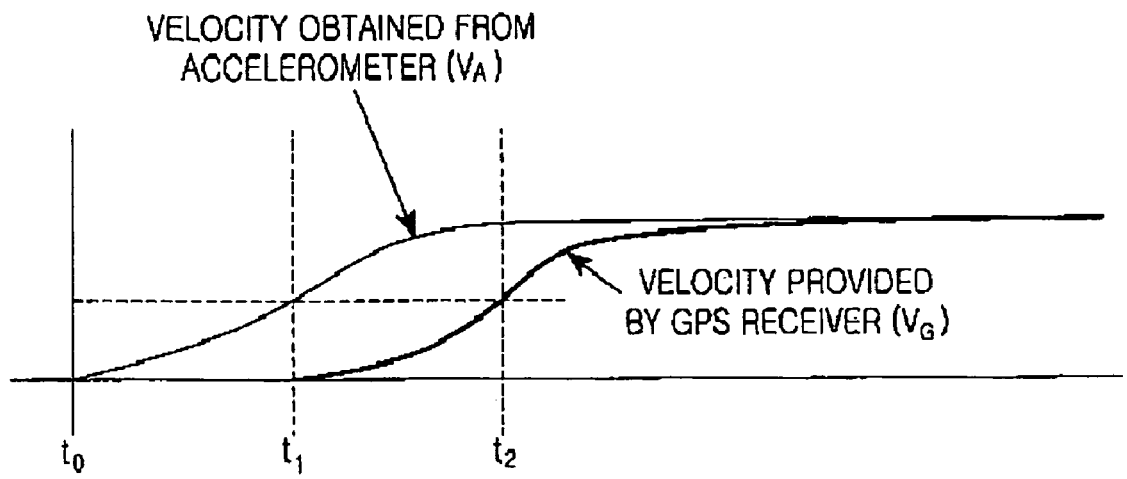
FIGS. 6A and 6B are views illustrating a time delay estimation method of a GPS receiver according to one embodiment of the present invention.
Figure 6B:
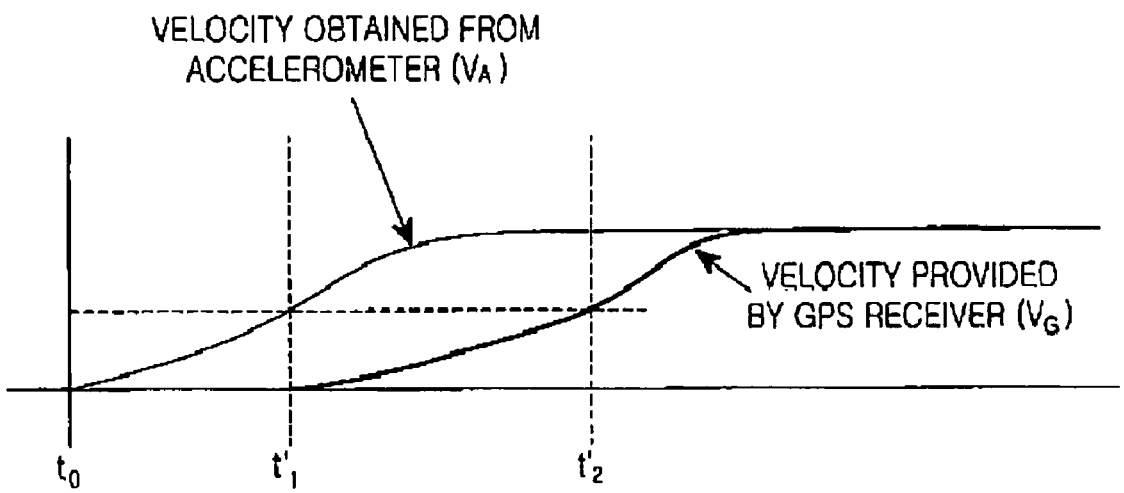

FIGS. 6A and 6B are views illustrating a time delay estimation method of a GPS receiver according to these embodiments of the present invention.

In FIGS. 6A and 6B, when a first embodiment (when a reference velocity is '0') of the present invention is applied, the time delay of the GPS receiver becomes $t_1-t_0$. Further, when a second embodiment of the present invention is applied, the time delay of the GPS receiver becomes $t_2-t_1$. In FIGS. 6A and 6B, since operation characteristics of the GPS receiver and environmental factors are different from each other, the GPS receiver has different velocities. That is, the time delay of the GPS receiver may be differently displayed according to the operation characteristics of the GPS receiver and the environmental factors.

Accordingly, in view of reliability of the time delay of the GPS receiver, it is preferred to apply the second embodiment of the present invention, instead of a method of using a uniform reference velocity as described in the first embodiment of the present invention.

Accordingly, in the present invention, a time delay of a GPS receiver for a GPS/DR system, in which the GPS receiver and a DR system are independently combined with each other, can be estimated even without receiving a pseudo-range from the GPS receiver, and the GPS/DR system having a loosely-coupled structure which considers the time delay can be realized. Further, in the present invention, when a vehicle moves from a GPS reception area to a non-reception area and a GPS/DR system mode changes into a DR system mode, an initial velocity value can be estimated while a time delay is considered for a DR system. Furthermore, since a velocity measurement apparatus for vehicles designed in accordance with the present invention has a performance superior to a velocity measurement apparatus for vehicles in the prior art, it can ultimately contribute to the position estimation accuracy of a position measurement apparatus for vehicles.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for estimating a time delay of a GPS receiver in a hybrid navigation system, the hybrid navigation system including a DR system and the GPS receiver, the method comprising the steps of:
   a) setting a reference velocity for estimating the time delay of the GPS receiver;
   b) detecting velocity measurement results of the GPS receiver and the DR system;
   c) setting a moment, at which the detected velocity measurement result of the DR system exceeds the reference velocity, as a first reference time, and repeating step b);
   d) setting a moment, at which the velocity measurement result of the GPS receiver exceeds the reference velocity, as a second reference time; and
   e) calculating the time delay of the GPS receiver by subtracting the first reference time from the second reference time.

2. The method as claimed in claim 1, wherein, in step a), the reference velocity is set as '0'.

3. A method for estimating a time delay of a GPS receiver in a hybrid navigation system, the hybrid navigation system including a DR system and the GPS receiver, the method comprising the steps of:
   a) detecting velocity measurement results of the GPS receiver and the DR system;
   b) sensing a reference velocity for estimating the time delay of the GPS receiver when at least one of the detected velocity measurement results of the GPS receiver and the DR system is '0', and repeating step a);
   c) capturing a moment at which the detected velocity measurement result of the GPS receiver to exceeds '0' in a state in which the velocity measurement result of the DR system exceeds '0', setting the moment as a first reference time, setting the velocity measurement result of the DR system at the first reference time as the reference velocity, and repeating step a);
   d) capturing a moment at which the detected velocity measurement result of the GPS receiver exceeds the reference velocity, and setting the moment as a second reference time; and
   e) calculating the time delay of the GPS receiver by subtracting the first reference time from the second reference time.

4. An apparatus for estimating a time delay of a GPS receiver in a hybrid navigation system, the hybrid navigation system including a DR system and the GPS receiver, the apparatus comprising:

a velocity detection unit for detecting velocities measured by the GPS receiver and the DR system;

a velocity comparison unit for storing a reference velocity for estimating the time delay of the GPS receiver, and capturing a moment at which each velocity measured by the GPS receiver and the DR system exceeds the reference velocity; and a time delay calculation unit for calculating a time difference between the moment at which the velocity measured by the GPS receiver exceeds the reference velocity and the moment at which the velocity measured by the DR system exceeds the reference velocity, and estimating the time difference as the time delay of the GPS receiver.

5. The apparatus as claimed in claim 4, wherein the velocity comparison unit stores '0' as a value of the reference velocity.

6. An apparatus for estimating a time delay of a GPS receiver in a hybrid navigation system, the hybrid navigation system including a DR system and the GPS receiver, the apparatus comprising:

a velocity detection unit for detecting velocities measured by the GPS receiver and the DR system;

a velocity comparison unit for capturing a moment at which the velocity measured by the GPS receiver exceeds '0' to set the moment as a first reference time, setting the velocity measurement result of the DR system at the first reference time as a reference velocity, and capturing a moment at which the velocity measured by the GPS receiver exceeds the reference velocity to set the moment as a second reference time, and a time delay calculation unit for calculating a time difference between the first reference time and the second reference time, and estimating the time difference as the time delay of the GPS receiver.

* * * * *